United States Patent [19]

Netwig et al.

[11] Patent Number: 5,534,146

[45] Date of Patent: Jul. 9, 1996

[54] PROCESS FOR PRODUCING IN SITU POLYMERIZATION OF A REVERSE OSMOSIS MEMBRANE AND PRODUCT THEREFROM

[76] Inventors: Craig L. Netwig, 947 Intrepid Ct., Del Mar, Calif. 92014; David L. Kronmiller, 1717 N. Elm St., Escondido, Calif. 92026

[21] Appl. No.: 259,876

[22] Filed: Jun. 15, 1994

(Under 37 CFR 1.47)

[51] Int. Cl.$^6$ ................................................. B01D 71/64
[52] U.S. Cl. ............... 210/490; 210/500.38; 210/500.39; 427/244; 427/245
[58] Field of Search ................................. 210/490, 500.38, 210/500.39; 427/244, 245

[56] References Cited

U.S. PATENT DOCUMENTS

| | | | |
|---|---|---|---|
| 4,849,106 | 7/1989 | Mir | 210/490 |
| 4,851,127 | 7/1989 | Lee et al. | 210/490 |
| 4,867,881 | 9/1989 | Kinzer | 210/490 |

*Primary Examiner*—Morton Foelak
*Attorney, Agent, or Firm*—John J. Murphey; Murphey Law Offices

[57] ABSTRACT

The process of producing a reverse osmosis membrane by the steps of preparing a liquid mixture of N-vinyl pyrrolidone, maleic anhydride and maleimide, wetting a porous membrane with the mixture and irradiating the wetted membrane with laser energy with energy sufficient to polymerize the mixture to form a terpolymer of N-vinyl pyrrolidone, maleic anhydride and maleimide on the membrane.

9 Claims, 16 Drawing Sheets

PROCESS FOR PRODUCING IN SITU POLYMERIZATION OF A REVERSE OSMOSIS MEMBRANE AND PRODUCT THEREFROM

BACKGROUND OF THE INVENTION

1. Field of the Invention

This invention relates to the field of separation processes. More particularly, it pertains to reverse osmosis processes and to a process for producing a unique reverse osmosis membrane that exhibits a significantly high tolerance to chlorine and displays resistance to 2. Description of the Prior Art Reverse osmosis (RO) has been considered a viable method of obtaining commercial quantities of potable water for quite some time. The process is relatively straight forward. A volume of impure water, such as brackish water or sea water, is introduced against a semipermeable membrane and pressure is applied to the water to overcome or reverse the osmotic pressure thereacross. High fluxes (through puts) can be achieved without phase change and under isothermal conditions so that no heating or cooling is required.

Although there still is differing opinion on the method of semi-permeability in RO membranes, the majority of models follow the solubility-diffusion-imperfection model proposed by Applegate and Antonson[1] in 1972. The model assumes that the water and ions are transported through the semi-permeable membrane via a solubility-diffusion mechanism. An imperfection term is allowed that accounts for flaws that permit undiluted salts and particulate to pass the barrier. The transport equations are:

$$J_v = k_1(\Delta P - \Delta \pi) + k_3 \Delta P$$

$$J_s = k_{12} \Delta \pi + k_3 \Delta P C_0$$

where $J_v$ is the volume flux; $J_s$ is the salt flux; $k_1$, $k_2$ and $k_3$ are transport coefficients; P is the pressure difference across the membrane;

$$\Delta \pi = \pi_{brine} - \pi_{permeate}$$

and $C_0$ is the salt concentration.

The salt rejection then can be shown as:

$$R = [C_0 \Delta P(1+\alpha) + \pi_0(C_0+\beta) - [C_0^2 \Delta P^2(1+\alpha) + 2C_0 \Delta P \pi_0$$

$$(1+\alpha)(C_0+\beta) + \pi_0^2(C_0+\beta)^2 - 4\pi_0 \Delta P C_0^2]1/2/2\pi_0 C_0$$

where $\alpha = k_3/k_1$, $\beta = k_2/k_1$ and $\pi_0$ is the osmotic pressure on the brine side of the membrane. Previous researchers[2] have shown that the solvent transport coefficient, $k_1$, is inversely proportional to the log of an activation energy for transporting the solvent through the membrane. Experimental data[3] has shown that as salt concentration increases, the value of $k_1$ always decreases. It is thought[4] that the semi-permeable membrane undergoes a hydration-dehydration process effecting this transport coefficient.

[1]. T. Wydeven, *A Survey of Some Regenerative Physico-Chemical Life Support Technology* (NASA), NASA Technical Memorandum 101004, November 1988.
[2]. G. P. Muldowney and V. L. Punzt, *A Comparison of Solute Rejection Models in Reverse Osmosis Membranes for the System Water-Sodium Chloride-Cellulose Acetate*, Ind. Eng. Chem. Res. 1988, 27, 2341–2352. 1988.
[3]. D. L. Kronmiller, unpublished research.
[4]. S. G. Il'Yasov, I. N. Kalvina, G. A. Kyulyan, V. F. Moskalenko, and E. P. Ostapchenko, *Sov. J. Quantum Electron.*, 4, 1287 (1975).

The terms $k_2$ and $k_3$ changes are more complex, but they seem to collectively decrease to produce a decrease in salt flux approximately equal to the volume flux decrease. Therefore, for isobaric operation, rejection is independent of salt concentration.

Table 1 shows typical transport coefficients for cellulose acetate and polyamide membranes.

TABLE 1

TRANSPORT COEFFICIENTS FOR CELLULOSE ACETATE AND POLYAMIDE MEMBRANES

| Membrane | $k_1^a \times 10^{10}$ | $k_2^b \times 10^{12}$ | $k_3^a \times 10^{12}$ |
|---|---|---|---|
| Cellulose acetate | 0.26 | 0.13 | 0.03 |
| TF Polyamide | 3.45 | 1.18 | 1.53 |

$^a$is in units of liters/cm$^2$-sec-psi.
$^b$is in units of moles NaCl/cm$^2$-sec-psi.

The most widely used form for the production of high purity water is the spiral wound membrane (see FIG. 1). The spiral wound construction results in high surface area, which yields substantially higher flux per membrane unit. Further, the physical spacing between semi-permeable leaves, that make up the spiral wound form, provide a flow characteristic that diminishes the physical fouling problem.

Reverse osmosis membranes have become the liquid permeation separation process of choice over the last two decades. They have taken on several different physical forms as dictated by the application process. They currently are found in tubular form used widely for waste management and food processing. Hollow fiber membranes have been used in limited applications but suffer inherently from the fouling resulting in a substantial cost disadvantage.

Dual layer (DL) membranes have had limited application. The dual layer membrane is made from a mixture of zirconium oxide and polyacrylic acid deposited on the interior of a porous metal or ceramic tube[5]. DL membranes have a high fouling rate and are not chemically stable under many operating conditions.

[5]. T. Wydeven, *A Survey of Some Regenerative Physico-Chemical Life Support Technology* (NASA), NASA Technical Memorandum 101004, November 1988.

The first significant commercial applications for RO membrane use were brackish water purification and sea water desalination. The first semi-permeable membranes used were of cellulose acetate construction. These membranes were limited in use to waters having a pH of 4 to 7. Further, high feed pressures were required to obtain significant flows. The high pressure was not only costly but also limited the life due to physical deformation of the semi-permeable membrane.

In 1971, Richter and Hoehn[6] patented a permselective, aromatic, nitrogen-containing polymeric membrane which initiated a new class of practical reverse osmotic membranes which require lower feed pressures and produce higher purity water. Salt rejection of greater than 99% was finally available. Further, the chemical composition resulted in a membrane which was more stable over wide ranges of pH. However, the new semi-permeable membrane was intolerant of halogens such as chlorine, which is routinely used in biostatic treatment of water.

[6]. J. W. Richter and It. H. Hoehn, U.S. Pat. No. 3,567,632 (1971).

Further, pressures of 6875 kPa (1000 psi) were still required.

The introduction by Filmtec (now owned by DOW, Inc.) of the FT30 thin film polyamide semi-permeable membrane brought about the most recent economical changes in RO membrane characteristics. Pressures of only 1550 kPa (225 psi) were necessary to produce water of greater than 99% salt rejection at acceptable flow rates for industrial application. As industry applied these RO membrane systems to various high purity water needs, many process problems were solved. However, the membranes still have chlorine tolerance problems and fouling problems[7].

[7]. D. L. Kronmiller, *Membrane Scaling, Controlling Silicates in RO Water Systems*, Ultrapure Water, March 1992.

To increase the efficiency and economical potential for reverse osmosis high purity water systems, a new semi-permeable membrane material must be sought that has the necessary physical characteristics. Polymers based on poly-vinylpyrrolidone have shown promise in ultrafiltration and microfiltration applications[8] by cross-linking the hydrophilic polymer after fixation on an appropriate substrate of flat or tubular hollow fiber structure. Once again this hollow fiber structure is limited by the fact that it is easily fouled. The semi-permeable membrane obtained has high thermal stability, improved chemical resistance, good mechanical durability. However, the composition of the polymer resulted in pore sizes too large to produce the high water purity.

[8]. D. W. Hendrick, A. Cornelis, Smolders, U.S. Pat. No. 4,798,847 (1989).

The several advantages of laser-initiated polymerization are important to the development of a viable semi-permeable membrane. Selective bond activation prevents dispersing the energy to all degrees of freedom leading to random thermal heating which can cause thermal degradation; eliminates unwanted competing side reactions which lead to impurities that diminish the semi-permeable membrane characteristics.

SUMMARY OF THE INVENTION

This invention is a process of producing a new semi-permeable membrane comprising a new N-vinylpyrrolidone polymer using laser-initiated polymerization. The several advantages of laser-initiated polymerization are important to the development of a viable semi-permeable membrane. Selective bond activation prevents dispersing the energy to all degrees of freedom leading to random thermal heating which can cause thermal degradation; eliminates unwanted competing side reactions which lead to impurities that diminish the semi-permeable membrane characteristics.

Laser-initiated polymerization is potentially an energy efficient chemical reaction utilizing coherent high density energy in the form of light to selectively synthesize the exact molecular structure with the possibility of high quantum yields. The laser allows the formation of only the desired reaction intermediate species that will form the monomer ratios and sequences desired during polymerization involving more than one monomer. Whereas, thermally driven chemical reactions are governed by the statistical equipartition of the energy to all available reaction paths without the possibility of high yields of pure product.

The method of polymerization allowed by the laser is that of charge-transfer complexes. These complexes are formed by the removal of one electron from the donor molecule (D) in the presence of an electron acceptor molecule (A):

$$D + A \rightarrow [D^{\delta+} A^{\delta-}] \rightarrow D + A^-$$

The invention is a process for producing a reverse osmosis membrane by the steps of: preparing a mixture of N-vinylpyrrolidone, maleic anhydride, and maleimide, preferably in the mole ratio of 1:1:1; wetting a porous membrane with the mixture; and, and irradiating the wetted membrane with laser energy to polymerize the mixture to form a terpolymer of N-vinylpyrrolidone-maleic anhydride and maleimide. The resulting polymer exhibits flux rates on the order of 300% that of existing commercial RO membranes. In addition, the salt rejection rate remains high, at 97% while chlorine stability is greatly improved over that of commercial membranes.

Accordingly, the main object of this invention is a unique process of producing a highly stable RO membrane of N-vinylpyrrolidone-maleic anhydride and maleimide by use of laser initiated polymerization. Other objects of the invention include the unique terpolymer itself, an RO membrane that shows markedly less inclination to fouling, a membrane that is more resistant to chlorine exposure, and a membrane that is more alkali stable.

These and other objects of the invention will become more apparent when reading the description of the preferred embodiment along with the drawings that are appended hereto. The protection sought by the inventor may be gleaned from a fair reading of the claims that conclude this specification.

DESCRIPTION OF THE PREFERRED EMBODIMENT

Figure 1:
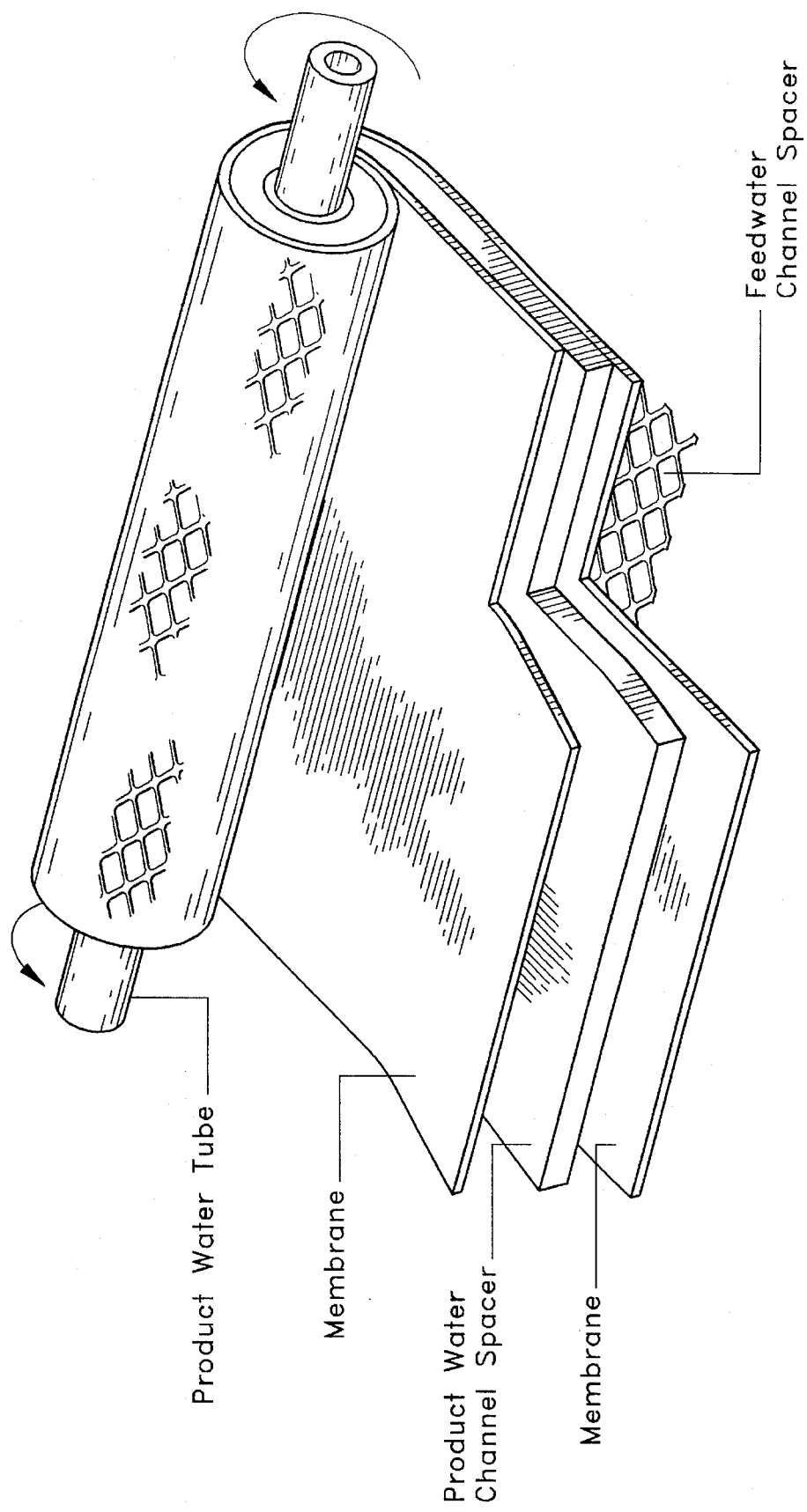
FIG. 1 is an illustrative view of a typical spiral-wound element use in reverse osmosis operations.

Calculations on a Tektronics—CaChe Scientific, Inc. CA52R reactivity modeling system found that the laser initiation of the N-vinylpyrrolidone- maleic anhydride polymerization would be more efficiently performed at the 325 nm line of a He—Cd laser. A 41 mw Omnichrome He—Cd laser was obtained.

The mechanism for laser initiation of the polymerization requires that a charge transfer complex (CTC) exists at the proper laser line. First experiments confirmed that the CTC's existed. The maleic anhydride and N-vinylpyrrolidone mixtures exhibited the typical optical color change of light yellow to deep pink upon irradiation. Similarly the maleimide and N-vinylpyrrolidone mixtures exhibited the presence of a CTC under irradiation starting with a very light yellow to a deep yellow-brown. Polymerization was verified by the FT-IR 0F before and after irradiation of the mixtures.

First polymerization of the N-vinylpyrrolidone- maleic anhydride system was performed in bulk and then applied as a thin drawn film which was crosslinked by the same 325 nm laser irradiation onto a Desalination Systems, Inc. polysulfone substrate. Thickness of the layer varied from casting-to-casting. Flow rates varied with the thickness of the layer from 0.2 liters/hr. to 0.06 liters/hr. at 100 psi and 23° C. All flows were higher than those of FT-30 type membrane. Chlorine stability was better than FT-30 type membrane. On exposure to concentrated pool chlorine the FT-30 membrane lost forty-two percent of salt rejection while the N-vinylpyrrolidone- maleic anhydride polymer membrane lost only five percent.

The addition of maleimide to the polymer was next attempted, and a thin film was cast on Desal type polysulfone as a substrate. The replacement of ten percent of the maleic anhydride by maleimide resulted in increased chlorine stability and slightly better flows. An overnight soak in pool chlorine solution resulted in no loss of salt rejection. In addition, stability to 5 N NaOH was obtained.

The fact that the flow was directly proportional to the thickness of the thin layer indicates that the barrier layer is most probably a symmetric membrane. This being so, a thinner layer can be applied which should yield a higher flow with good salt rejection. To this end, initial experiments applying the polymer using a fine bubble size while under irradiation has yielded an active layer. The process involves absorption into the surface of the bubble which presents a very thin dielectric surface target for the laser irradiation which initializes the polymerization as the monomers adsorb onto the substrate surface and polymerization occurs.

The laser initiated in-situ polymerization mechanism was verified using the dielectric bubble approach. The first step was the verification of the charge transfer complex existence under irradiation by the 325 nm He—Cd laser. A shift in the adsorption peak from 694 nm to 460 nm was obtained with 325 nm He—Cd irradiation of the terpolymer monomer mixture. This downward shift in peak absorption at 460 nm indicates the presence of the charge complex in bulk monomer mixture. This then lends support to the charge transfer initiated polymerization mechanism shown below for the n-vinylpyrrolidone and maleic anhydride system (the same mechanism applies for the maleimide where the ring 0 atom is replaced by an n atom).

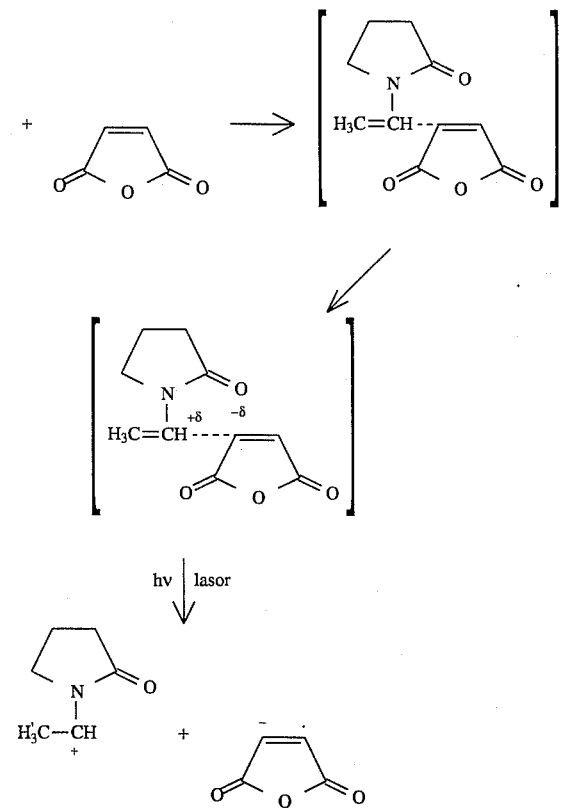

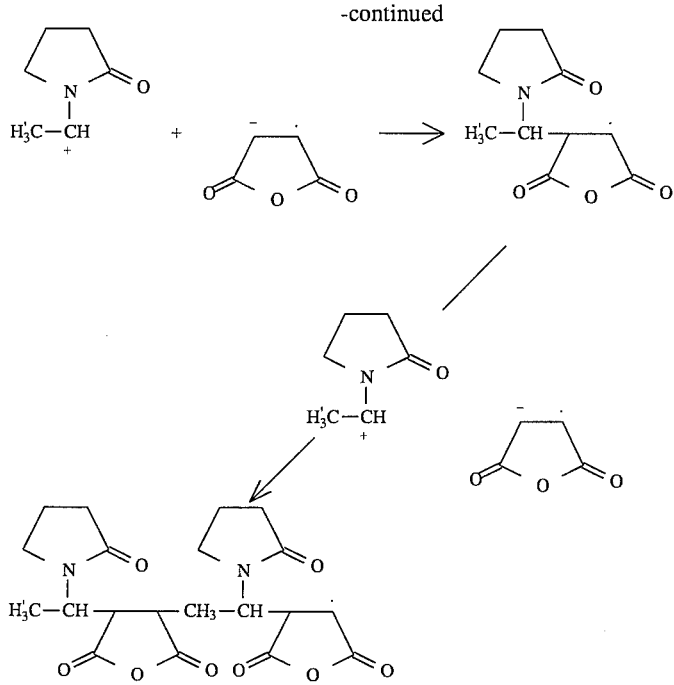

Figure 2:
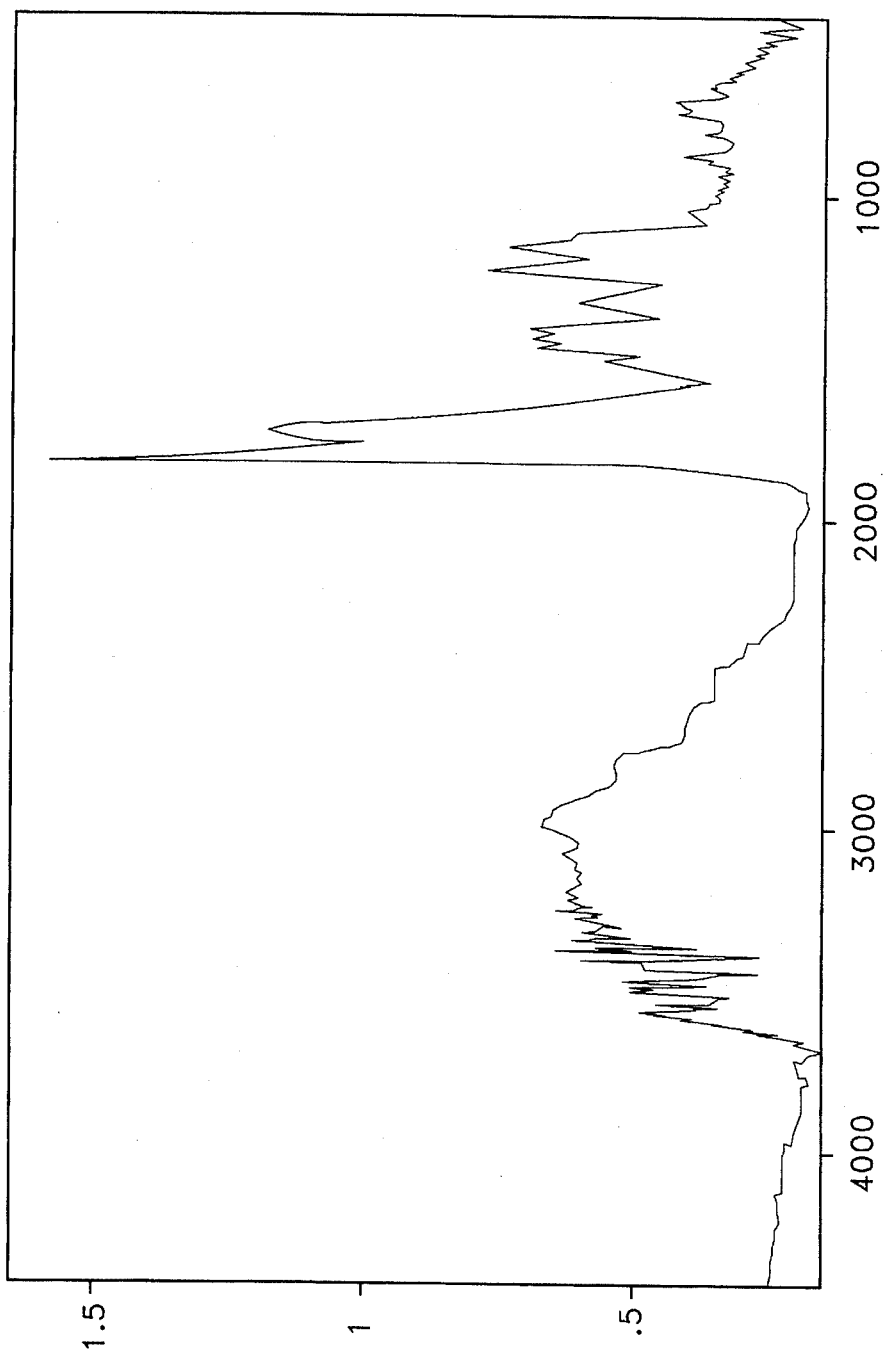
FIG. 2 is a graph shows the terpolymer (0.01:0.01:0.01 moles of n-vinylpyrrolidone maleic-anhydride-maleimide) after 7 mw He—Cd 325 nm irradiation in bulk with a nitrogen cover for 2 hours.
Figure 3:
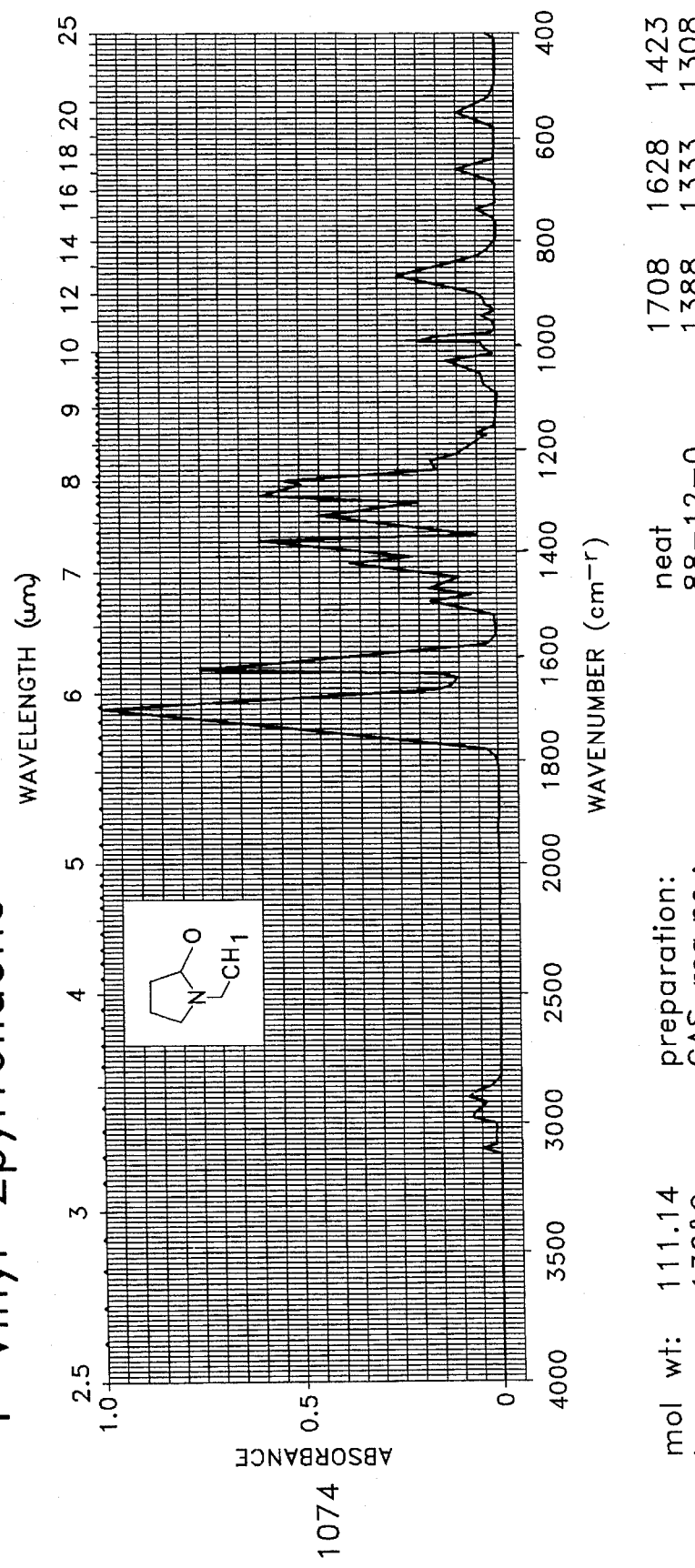
FIG. 3 is a graph of the spectra for n-vinylpyrrolidone.
Figure 4:
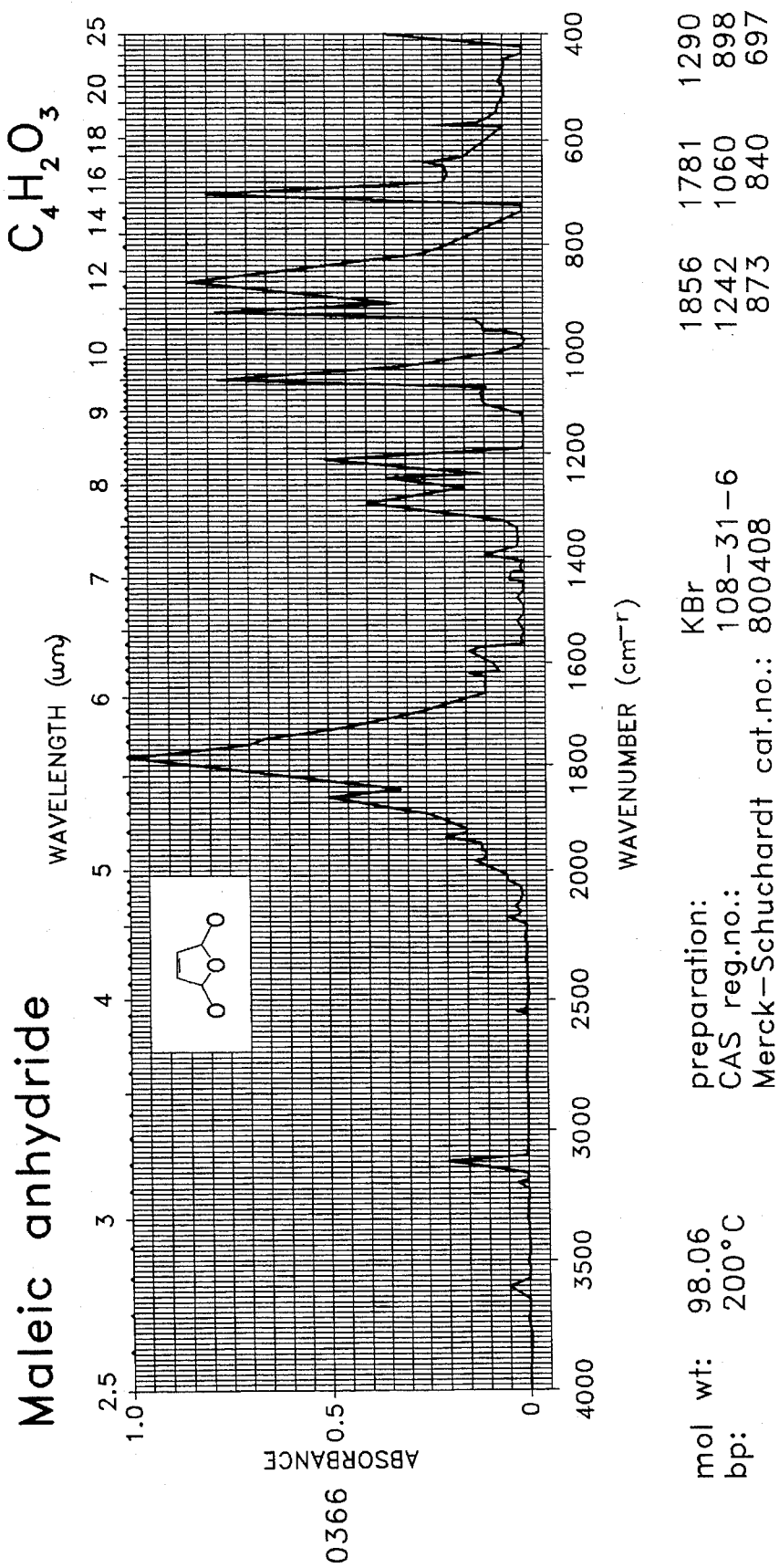
FIG. 4 is a graph of the spectra for maleic anhydride.
Figure 5:
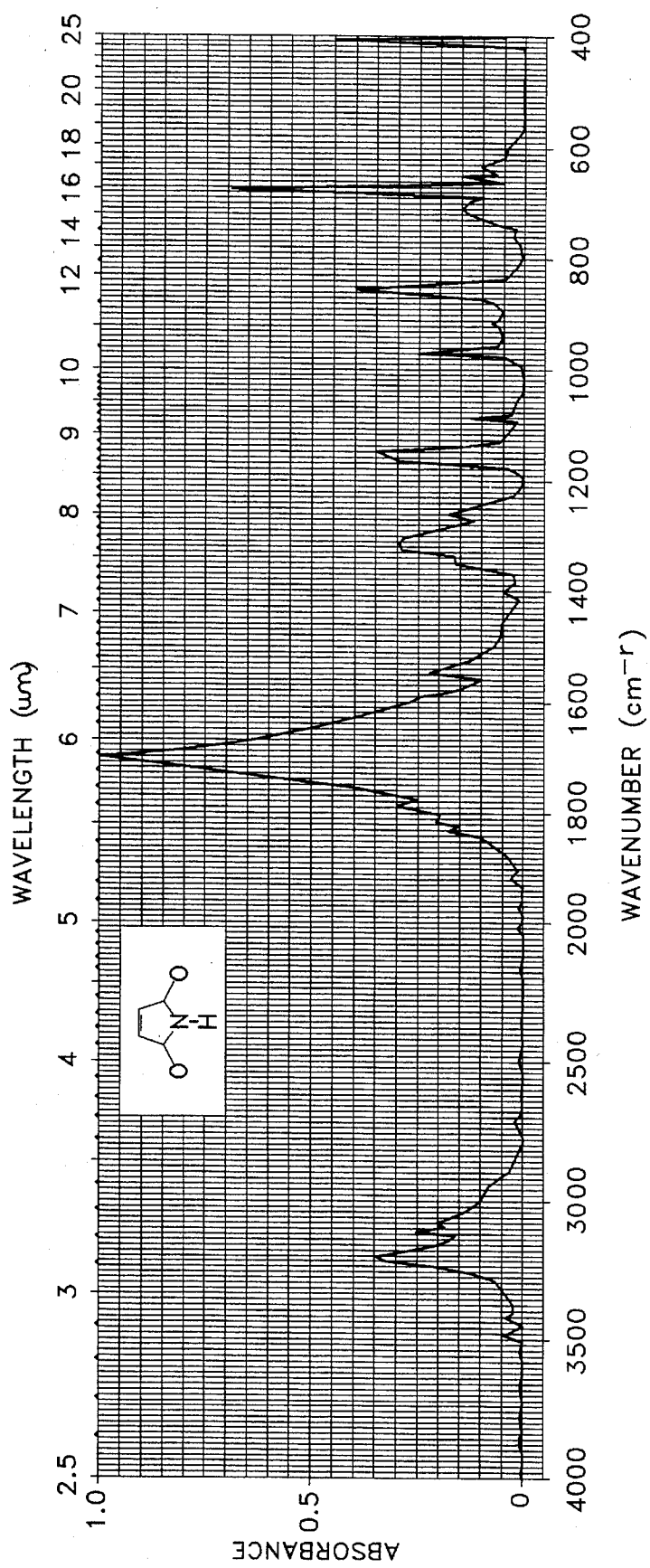
FIG. 5 is a graph of the spectra for maleimide.
Figure 6:
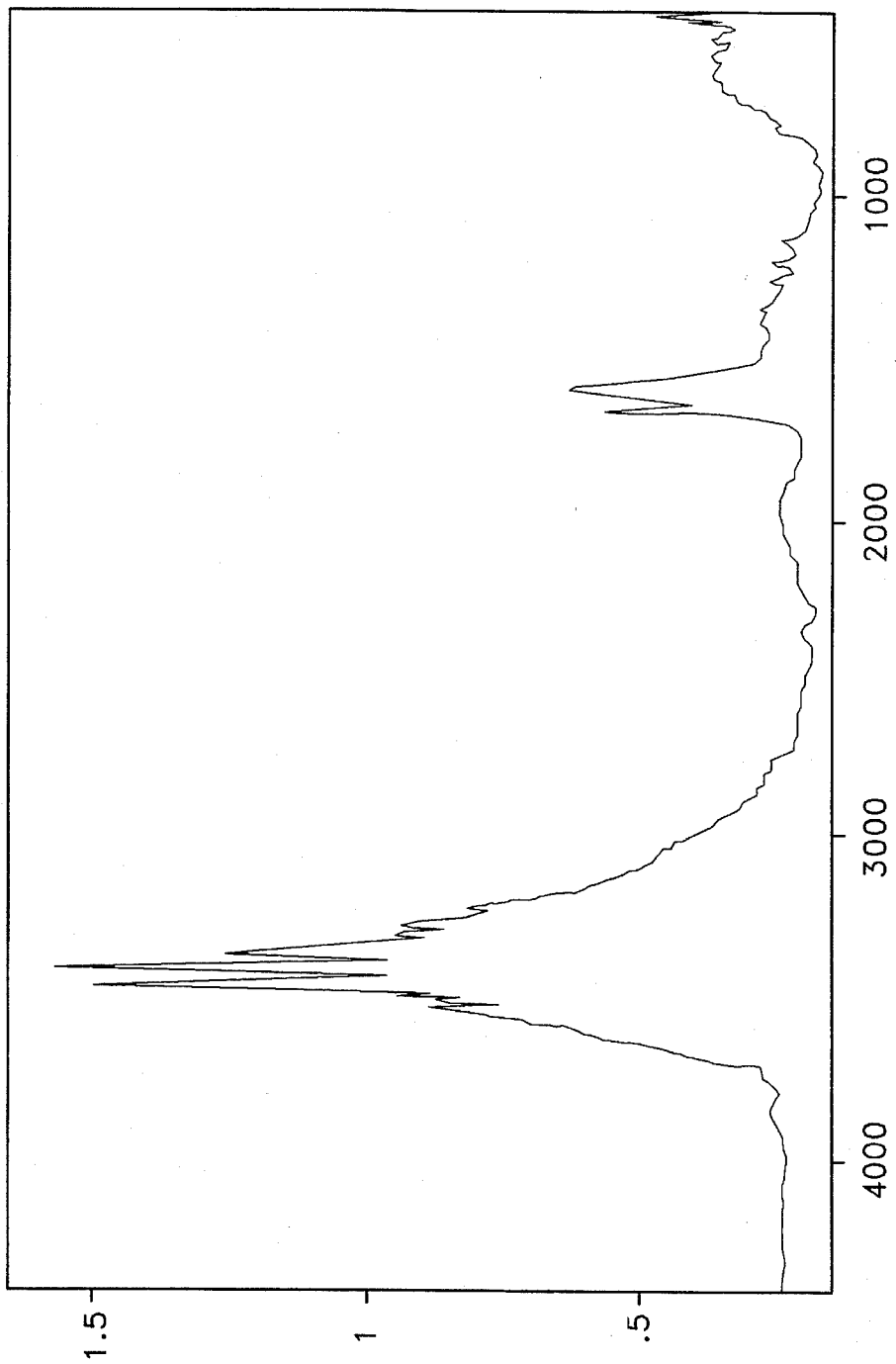
FIG. 6 is a graph of the spectra shown in FIG. 2 after refluxing in methanol and KOH for two hours.

Fourier transform infrared spectra were obtained. FIG. 2 shows the terpolymer (0.01:0.01:0.01 moles of n-vinylpyrrolidone - maleic anhydride - maleimide) after 7 mw He—Cd 325 nm irradiation in bulk with a nitrogen cover for 2 hours. The vinyl group absorption at 985 and 940 cm$^{-1}$ are not present. FIGS. 3, 4 and 5 are spectra for n-vinylpyrrolidone, maleic anhydride and maleimide. It can also be seen that the carbonyl absorption and the ring structure are still present, which supports the above reaction mechanism of initiation of polymerization via the charge transfer complex. Further, FIG. 6 shows the spectra after refluxing in methanol and KOH for two hours. The diminished carbonyl absorption confirms that the ring structure was present.

A vacuum irradiation chamber was designed and built to allow a 5 mw 325 nm He—Cd laser line to enter the chamber near the monomer spray entrance. The chamber was held at 18 inches of vacuum, and the monomer mixtures were sprayed into the chamber creating a fine uniform mist at the point where the 5 mw irradiation entered the chamber.

Figure 7:
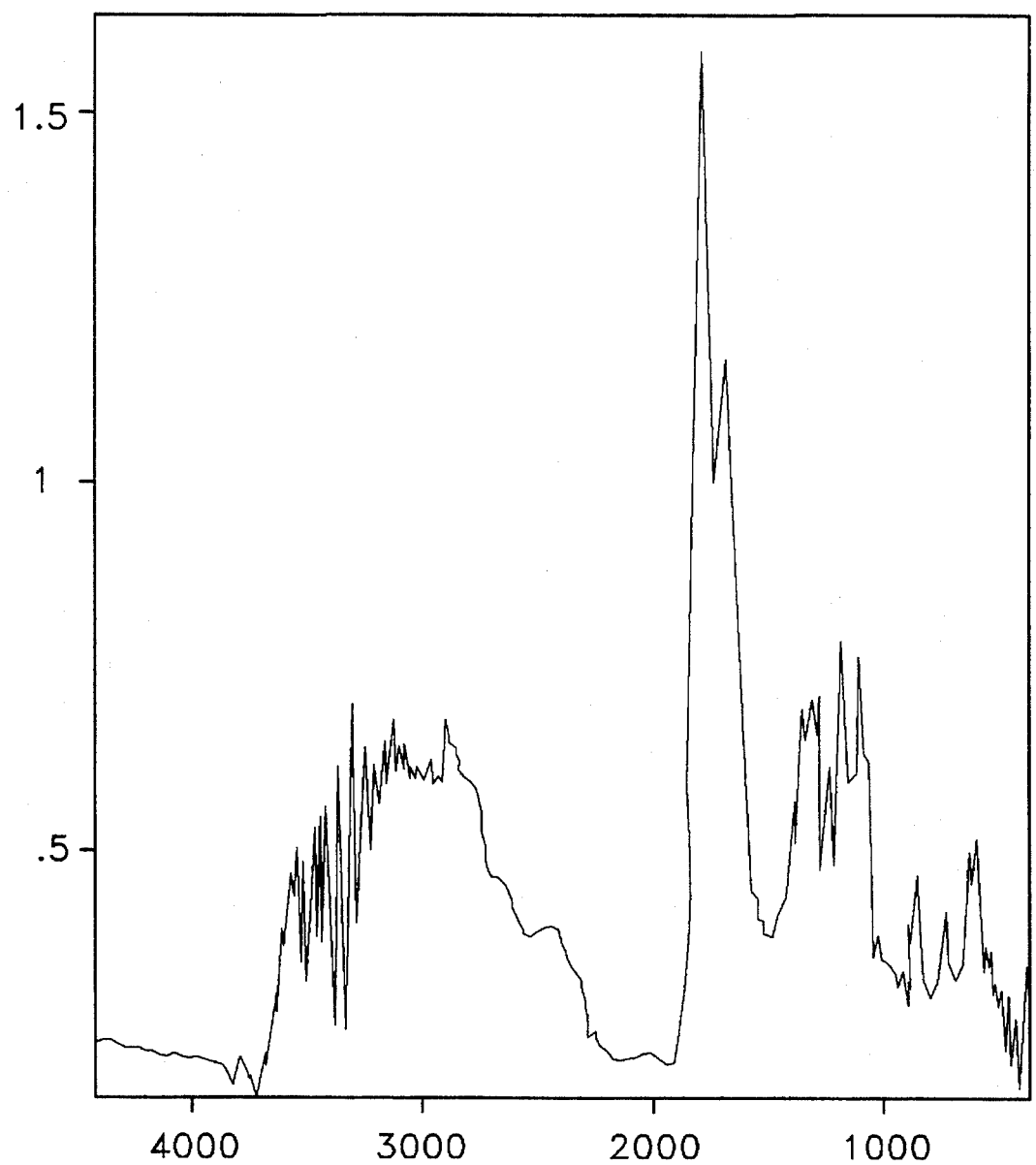
FIG. 7 is a graph of the FT-IR of the terpolymer formed under 325 nm He—Cd irradiation in the vacuum chamber.

The above polymerization process was confirmed using the dielectric bubble method. FIG. 7 shows the FT-IR of the terpolymer formed under 325 nm He—Cd irradiation in the vacuum chamber. The monomer mixture bubbles were irradiated as they were sprayed into the vacuum chamber and the terpolymer was collected. Again it can be seen that the 985 and 940 cm$^{-1}$ are not present when compared to FIGS. 3, 4 and 5 of the monomer spectra.

The number average molecular weights of the polymers was determined by using the standard K-value technique of relative viscosity. Sample were prepared by injecting the monomer mixtures into the chamber and precipitating the polymer in well-stirred methyl alcohol. Table II lists the effect of laser irradiation exposure time on the molecular weight. No real effect wad observed when irradiation times were prolonged. The ratios of monomers away from the CTC 1:1:1 ratio did not result in detectable polymer formation.

TABLE II

EFFECT OF IRRADIATION TIME

| Monomer Ratio | Irradiation Time | Molecular Weight |
|---|---|---|
| 1:1:1 | instantaneous | 34660 |
| 1:1:1 | 15 seconds | 33280 |
| 1:1:1 | 2 minutes | 34210 |
| 1:3:3 | instantaneous | no polymer |

Several membranes were then produced using different monomer ratios. Table 3 shows that flow and chemical stability are enhanced when the maleimide is added to the polymer chain. The characteristics of a Filmtec TF-30, Desalination DSI-SG15614, and polysulfone substrate membrane are listed for reference. Deviation from the one-to-one molar ratios resulted in a lower performance membrane.

The membranes were prepared by the dielectric bubble method in 18 inches of vacuum chamber with the 325 nm. He—Cd line at 5mw. A spray of the monomer mixture using nitrogen as propellant was injected into the chamber with laser irradiation focused on the injection port opening. After injection of the spray the laser line was scanned over the membrane surface to continue the polymerization.

TABLE III

EFFECT OF MONOMER RATIO ON PERFORMANCE

| Monomers | Mole Ratio | flow @ 100 psi | % salt rejection[1] | Chlorine Stability[2] | Acid Stability[3] | Alkali Stability[4] |
|---|---|---|---|---|---|---|
| Filmtec FT-30 membrane | NA | .4 ml/min. | 97% | 42% | 12% | 29% |
| Desalination Systems DSI-SG15 614 | NA | no flow[5] | 97% | 82% | 26% | 14% |
| Polysulfone[6] | NA | 6.0 ml/min. | 0% | NA | NA | NA |
| NVP-MA | 1:1 | .5 ml/min. | 64% | 15% | 8% | 12% |
| NVP-MI | 1:1 | .7 ml/min. | 97% | 0% | 0% | 4% |
| NVP-MA-MI | 1:1:1 | 1.2 ml/min. | 99% | 2% | 0% | 2% |
| NVP-MI | 1:3 | .4 ml/min. | 25% | 5% | 8% | 8% |
| NVP-MA | 1:3 | .4 ml/min. | 18% | 5% | 12% | 12% |

[1] Multiple applications of the barrier were done until salt rejection didn't increase
[2] Percent to total salt rejection loss after 24 hour exposure to pool chlorine concentrate
[3] Percent of total salt rejection loss after 24 hour exposure to pH 1.5 HCl. solution
[4] Percent of total salt rejection loss after 24 hour exposure to Ph 14.0 NaOH solution
[5] When pressure was increased to 175 psi flow was .2 ml/min.
[6] The polysulfone listing is for reference only. This membrane was used as the substrate for the experimental membrane and was not expected to have ant salt rejection properties. This is the same substrate used b Desalination systems for their UF and RO spiral wound membranes.

Scanning Electron Micrographs (SEM) were obtained to verify the membrane structure. The SEMs were obtained at the Scripps Institute for Oceanography using a Cambridge 3600. Specimens were prepared by freezing in liquid nitrogen and snapping for cross-section.

Figure 8:
FIG. 8 is an SEM (Scanning Electron Micrograph) of the surface of a commercial membrane, FT-30 type, manufactured by Dow Chemical.
Figure 9:
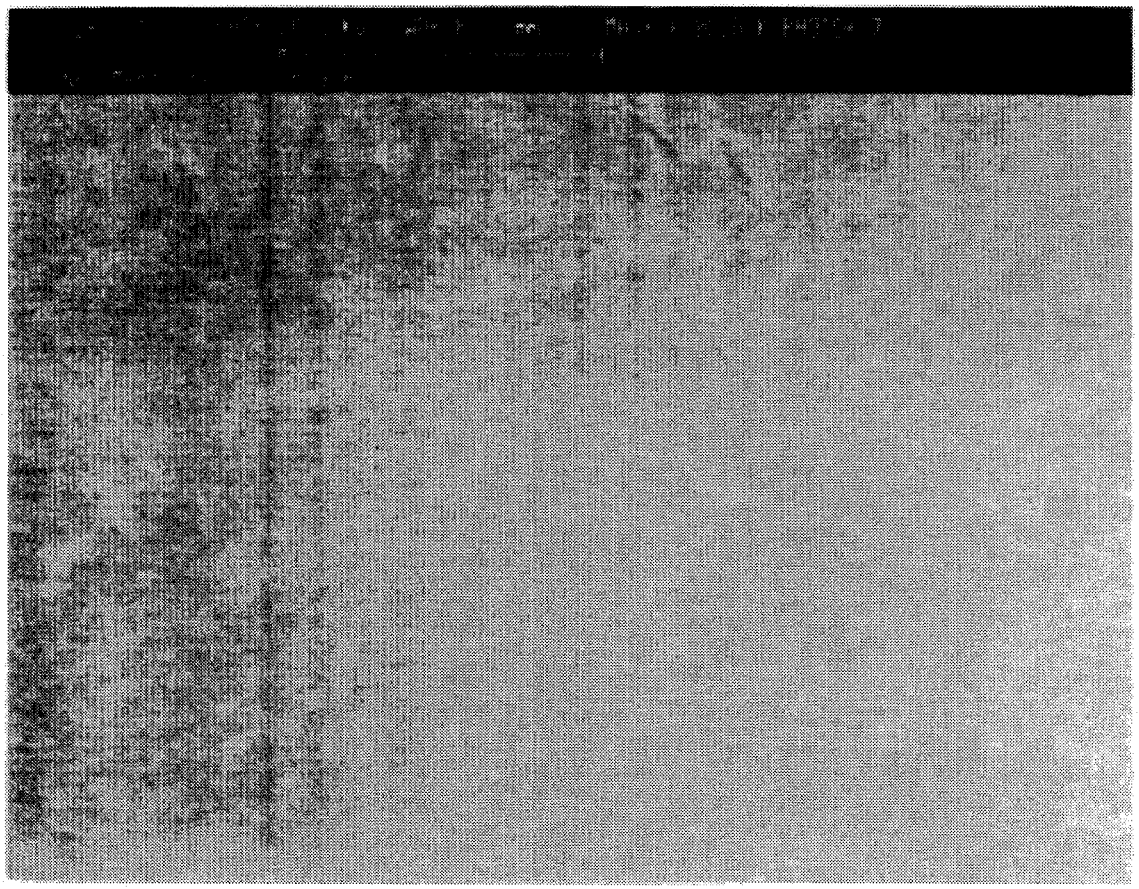
FIG. 9 is an SEM of the surface of a membrane made by the process of this invention.

FIG. 8 is the SEM of the surface of a commercial membrane, FT-30 type, manufactured by Dow Chemical. It can be seen that the surface has continuous random voids which are available for foulant to grow or attach itself in a protective manner. FIG. 9 is the SEM of the surface of the new membrane. It is obvious that this smooth surface presents less of a fouling potential. To test this, a fouling experiment was run where both samples were presented at 100 spi and 25° C. with dechlorinated San Diego tap water that had colloidal clay and biological infection.

TABLE IV

FOULING COMPARISON

| Sample | Initial Flow at 100 psi | 30% flow lose time |
|---|---|---|
| Dow FT-30 | .4 ml/min. | 30 minutes |
| New Membrane | 1.2 ml/min. | >8 hrs. |

Figure 10:
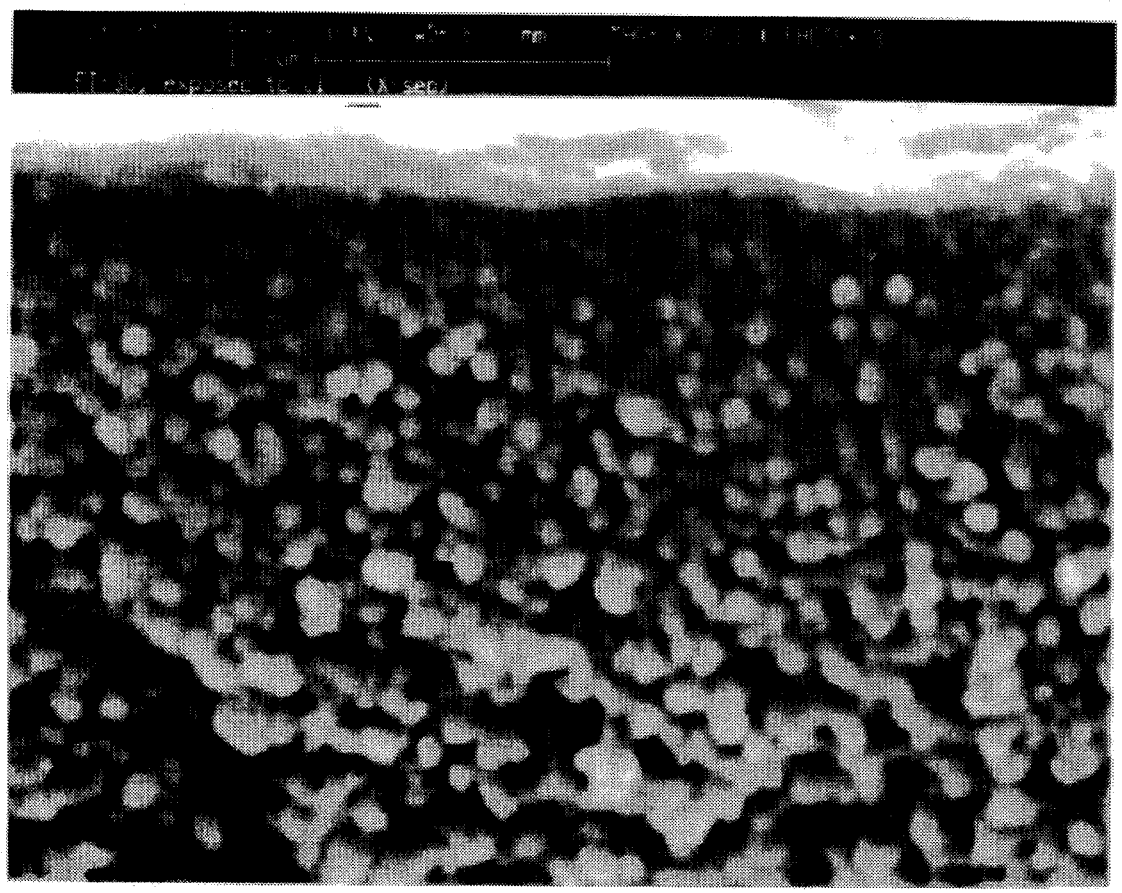
FIG. 10 is an SEM of a normal, untreated surface of the polysulfone substrate used for the new membrane of this invention.
Figure 11:
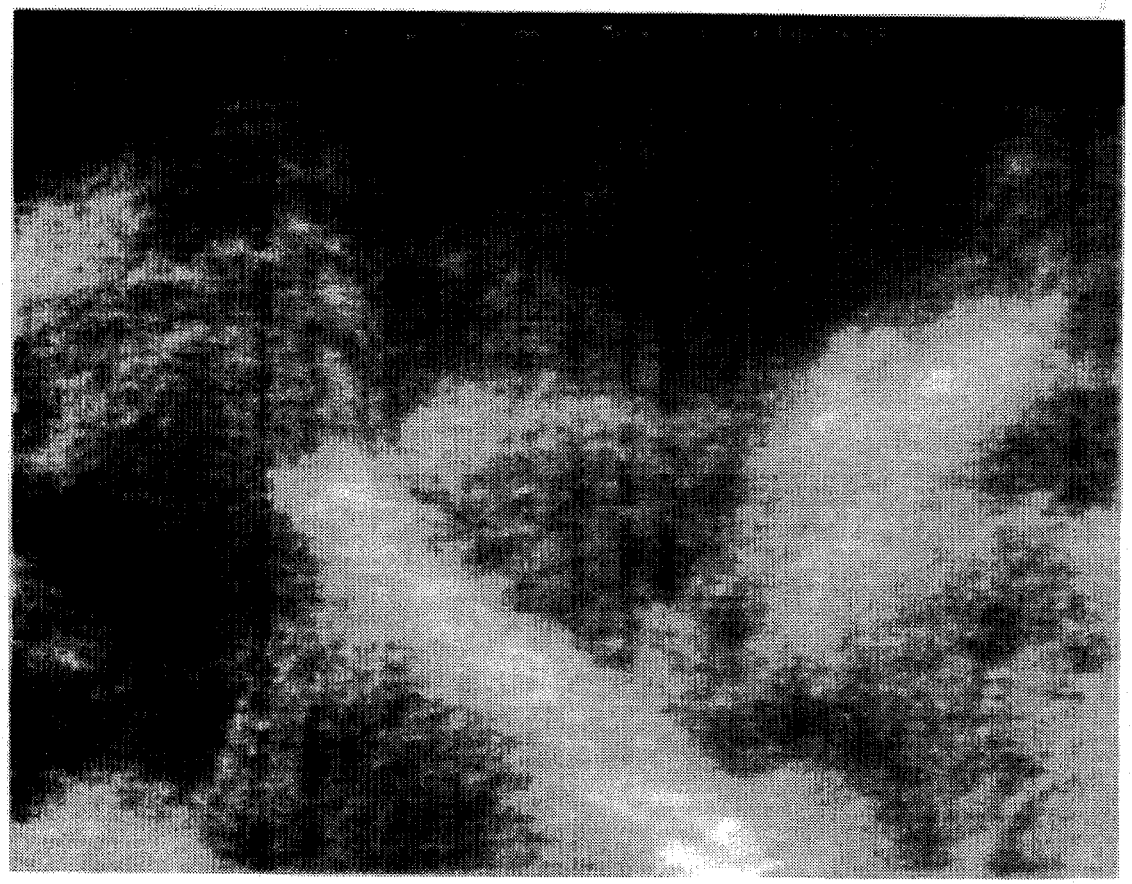
FIG. 11 is an SEM of a thinner layer of new membrane applied to the surface.

FIG. 10 shows the normal untreated surface of the polysulfone substrate used for the new membrane. It can be seen that the rough surface is completely covered by a smooth barrier. FIG. 11 is a thinner layer of new membrane applied to the surface. The thinner layer was obtained by a shorter spray period into the chamber.

Figure 12:
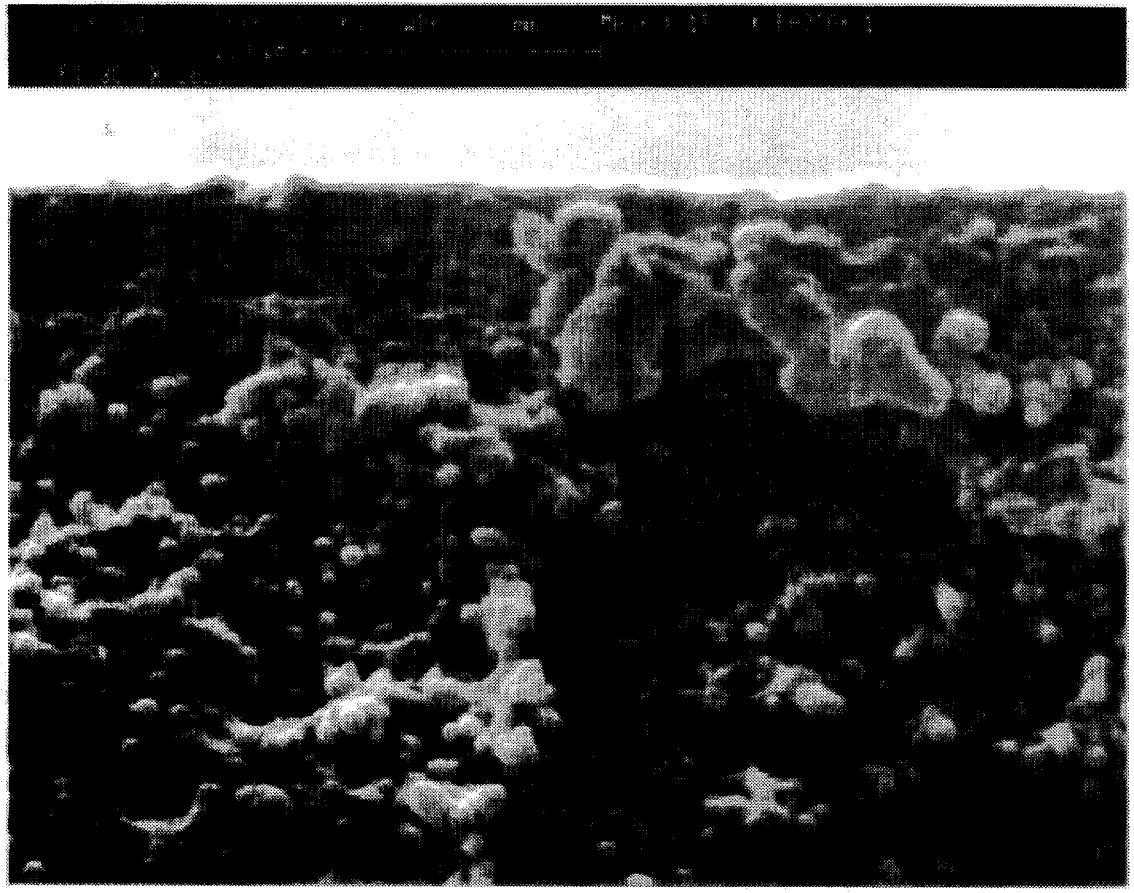
FIG. 12 is an SEM showing a cross-sectional view of a typical FT-30 membrane.
Figure 13:
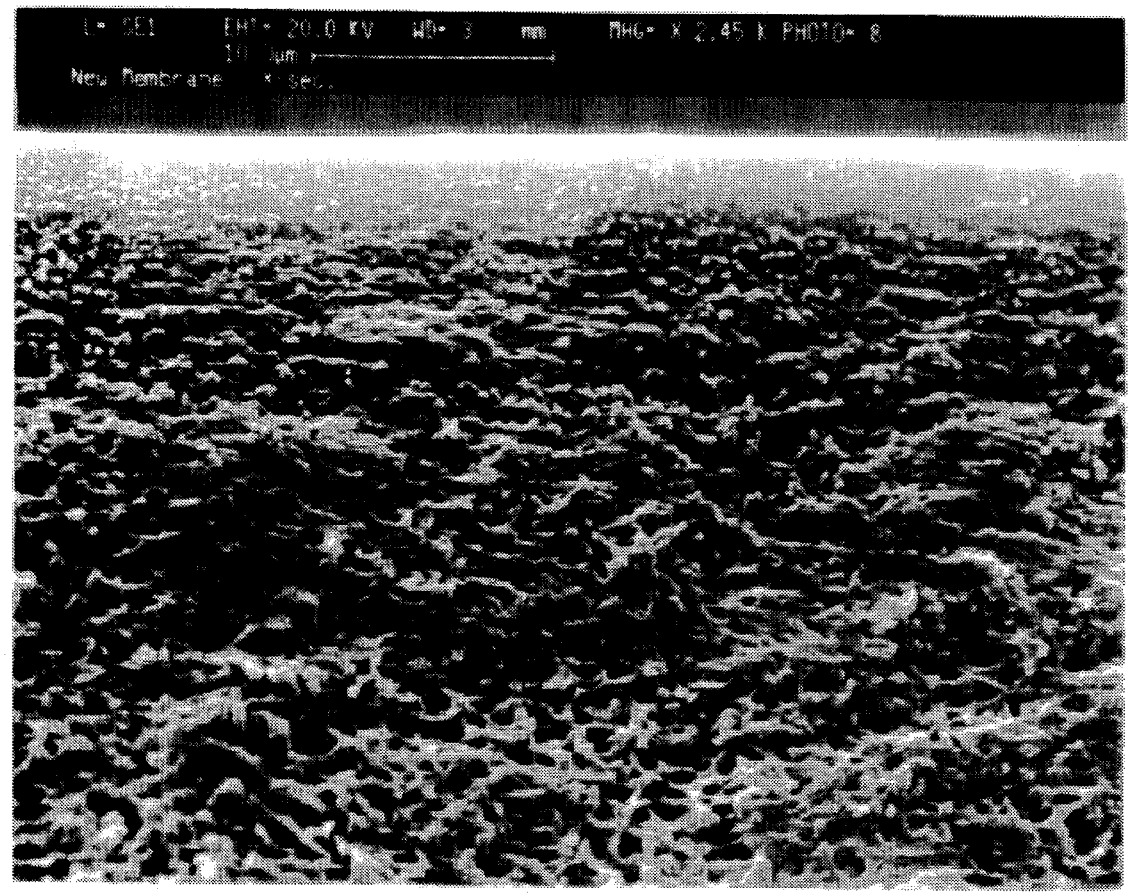
FIG. 13 is an SEM showing a cross-sectional view of the new membrane of this invention.

FIG. 12 is the cross-sectional view of the FT-30 membrane. A random agglomeration of polymer with random size voids can be observed. FIG. 13 shows the cross-section of the new membrane. It can be seen that the new membrane has a "honeycomb-like" substructure. When the two structures are compared, one would expect the new barrier membrane to be less susceptible to compression and shear failure than the FT-30 on the polysulfone substrate due to its uniform structure.

Physical stability was tested by repeatedly cycling operating pressure from 30 to 300 psi until physical fatigue results in salt rejection failure. The FT-30 started loosing flow in the test cell after 27 cycles. The new membrane was cycled 100 times without change.

Thermal stability was tested by repeatedly cycling temperatures from 25° C. to 80° C. until salt rejection failure occurs. The FT-30 started loosing salt rejection after 11 cycles. The new membrane was cycled 30 times without change.

Figure 14:
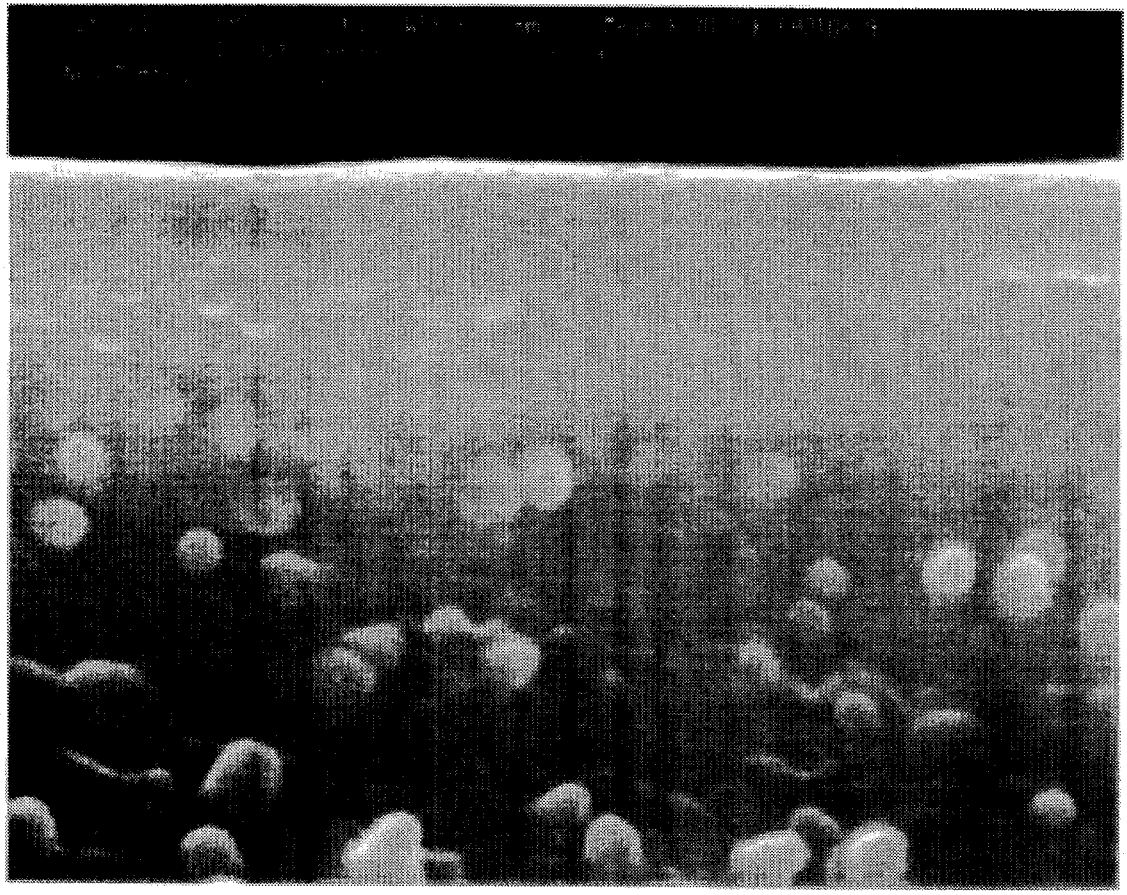
FIG. 14 is an SEM showing the cross-sectional view at 30,000 magnification of the new membrane of this invention.
Figure 15:
FIG. 15 is an SEM showing the cross-sectional view at 30,000 magnification of a typical polysulfone substrate; and, FIG. 16 is an SEM of an attempt to make a membrane with the monomer ratios of 1:3:3 n-vinylpyrrolidone:maleic anhydride and maleimide.
Figure 16:

FIGS. 14 and 15 show the surface of the cross-section at 30,000 magnification of the new membrane and the polysulfone substrate respectively. The formation of a thin skin later of approximately 1μm. can be observed. This very thin skin coupled with a uniform honeycomb-like substructure is probably responsible for the high flux obtained. FIG. 16 is a SEM of an attempt to make a membrane with the monomer ratios of 1:3:3 n-vinyl-pyrrolidone:maleic anhydride and maleimide. The membrane showed very little salt rejection. It can be seen that the polymerization via the CTC at monomer 1:1:1 ratios is needed to produce an active reverse osmosis membrane.

One of the very unique characteristics of this process is that the n-vinylpyrrolidone is a solvent for the other two monomers and the polysulfone substrate. It appears from the SEMs that the He—Cd 325 nm. laser irradiation coupled with the solvent action of the n-vinyl pyrrolidone and the CTC polymerization initiation allows a mixture of polysulfone and polymer to form the honeycomb-like structure which decreases in size and concentration as the surface is approached. At the surface is left the very think skin of in-situ polymer.

What is claimed is:

1. The process of producing a reverse osmosis membrane by the steps of:
   a) preparing a liquid mixture of N-vinyl pyrrolidone, maleic anhydride and maleimide;
   b) wetting a porous membrane with said mixture; and,
   c) irradiating said wetted membrane with laser energy with energy sufficient to polymerize said mixture to form a terpolymer of N-vinyl pyrrolidone, maleic anhydride and maleimide on said membrane.

2. The process of claim 1 wherein said liquid mixture is a 1:1:1 molar mixture.

3. The process of claim 1, including the additional step of continuously feeding said wetted membrane to said irradiation to form a sheet of terpolymer coated membrane.

4. The process of claim 2 wherein said terpolymer has a molecular weight of between about 34,000 and 35,000.

5. The process of claim 2 wherein said terpolymer has a molecular weight of about 34,660.

6. The product produced by the process of claim 1.
7. The product produced by the process of claim 2.
8. The product produced by the process of claim 3.
9. The product produced by the process of claim 4.

* * * * *